US012046911B2

(12) United States Patent
Deshaies

(10) Patent No.: US 12,046,911 B2
(45) Date of Patent: Jul. 23, 2024

(54) WIRELESS CHARGING SYSTEM FOR SMARTDEVICES, KIT AND METHOD FOR USING THE SAME

(71) Applicant: MOBLEK INC., Montreal (CA)

(72) Inventor: Patrick Deshaies, Montreal (CA)

(73) Assignee: MOBLEK INC., Montreal (CA)

(*) Notice: Subject to any disclaimer, the term of this patent is extended or adjusted under 35 U.S.C. 154(b) by 681 days.

(21) Appl. No.: 17/251,539

(22) PCT Filed: Jun. 12, 2019

(86) PCT No.: PCT/CA2019/050830
§ 371 (c)(1),
(2) Date: Dec. 11, 2020

(87) PCT Pub. No.: WO2019/237197
PCT Pub. Date: Dec. 19, 2019

(65) Prior Publication Data
US 2021/0257855 A1 Aug. 19, 2021

(30) Foreign Application Priority Data
Jun. 13, 2018 (CA) .................. CA 3008263

(51) Int. Cl.
*H02J 50/00* (2016.01)
*H02J 50/10* (2016.01)
(Continued)

(52) U.S. Cl.
CPC ............ *H02J 50/005* (2020.01); *H02J 50/10* (2016.02); *G09F 7/20* (2013.01); *G09F 23/00* (2013.01); *H02J 2310/22* (2020.01)

(58) Field of Classification Search
CPC ...... H02J 50/005; H02J 50/10; H02J 2310/22; G09F 7/20; G09F 23/00
(Continued)

(56) References Cited

U.S. PATENT DOCUMENTS 8,896,264 B2 11/2014 Partovi
2013/0041730 A1* 2/2013 LoBianco ............... G09F 13/00
705/14.4
(Continued)

FOREIGN PATENT DOCUMENTS

CN 102576243 A 7/2012
CN 104065174 A 9/2014
(Continued)

OTHER PUBLICATIONS

Extended European Search Report of EP19819232.0 dated May 20, 2022.
(Continued)

*Primary Examiner* — Edward Tso
*Assistant Examiner* — Aaron Piggush
(74) *Attorney, Agent, or Firm* — Gowling WLG (Canada) LLP; Damien Calvet

(57) ABSTRACT

A charging system for wirelessly charging a smart device positioned over the charging system with a charger connectable to an electrical power source for charging the smart device, like a smartphone, and can be inserted inside a furniture through an opening located at its top surface; a fixing element compatible with the opening and affixed to the charger for maintaining the charger fixably engaged inside the opening below the top surface; and a removable cap for capping the fixing element. When the removable cap is made of a transparent material, the charging system is configured to provide an advertising message presented on a support affixable to the bottom surface of the transparent cap, the message being then visible through the transparent cap.

22 Claims, 11 Drawing Sheets

(51) Int. Cl.
*G09F 7/20* (2006.01)
*G09F 23/00* (2006.01)

(58) Field of Classification Search
USPC .......................................... 320/107, 108, 115
See application file for complete search history.

(56) References Cited

U.S. PATENT DOCUMENTS

| | | |
|---|---|---|
| 2014/0054961 A1 | 2/2014 | Metcalf et al. |
| 2014/0285140 A1* | 9/2014 | Jung ................ H02J 50/12 320/108 |
| 2015/0002088 A1* | 1/2015 | D'Agostino ............ H02J 50/70 320/108 |
| 2015/0130412 A1 | 5/2015 | Partovi |
| 2015/0244182 A1* | 8/2015 | Ozana ................ H02J 50/10 307/104 |
| 2016/0268843 A1 | 9/2016 | Baarman |
| 2017/0150264 A1* | 5/2017 | Nelson ................ A47C 7/72 |
| 2017/0317458 A1 | 11/2017 | Byrne et al. |

FOREIGN PATENT DOCUMENTS

| | | |
|---|---|---|
| CN | 106558920 A | 4/2017 |
| KR | 2017-0038656 A | 4/2017 |
| WO | 2014072975 | 5/2014 |

OTHER PUBLICATIONS

International Preliminary Report on Patentability of PCT/CA2019/050830 dated Dec. 15, 2020.

* cited by examiner

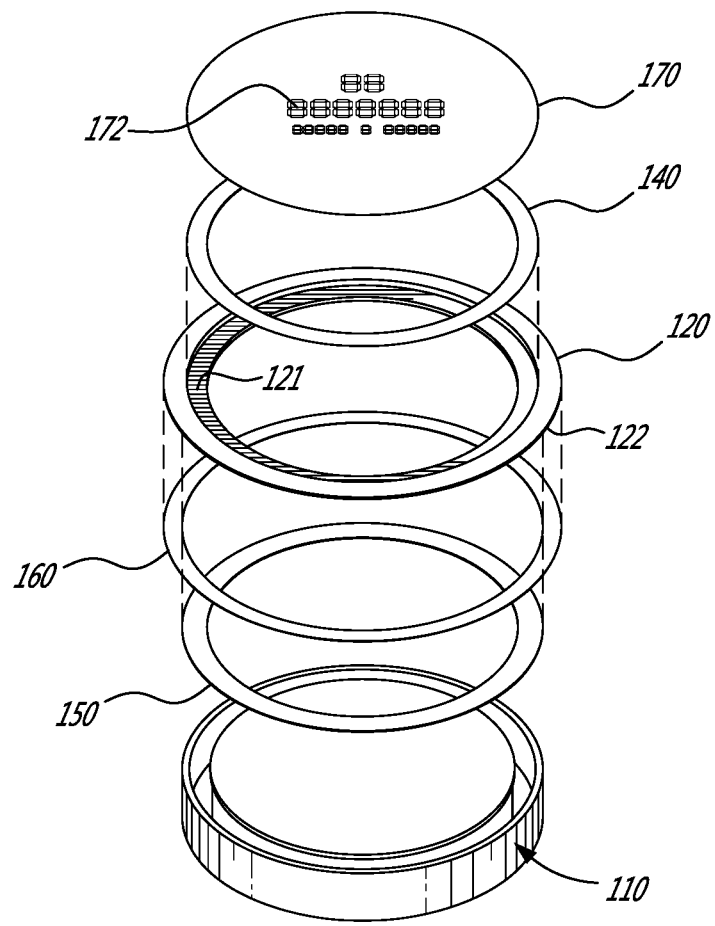
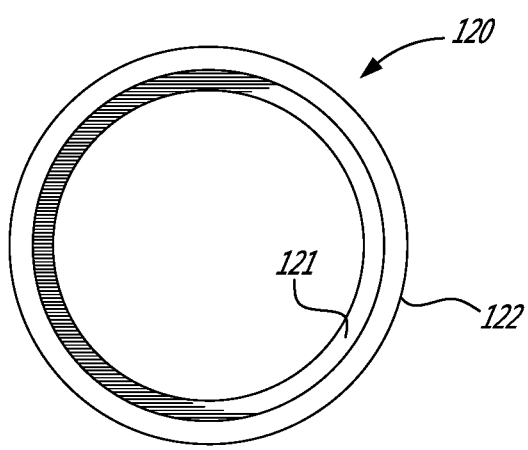

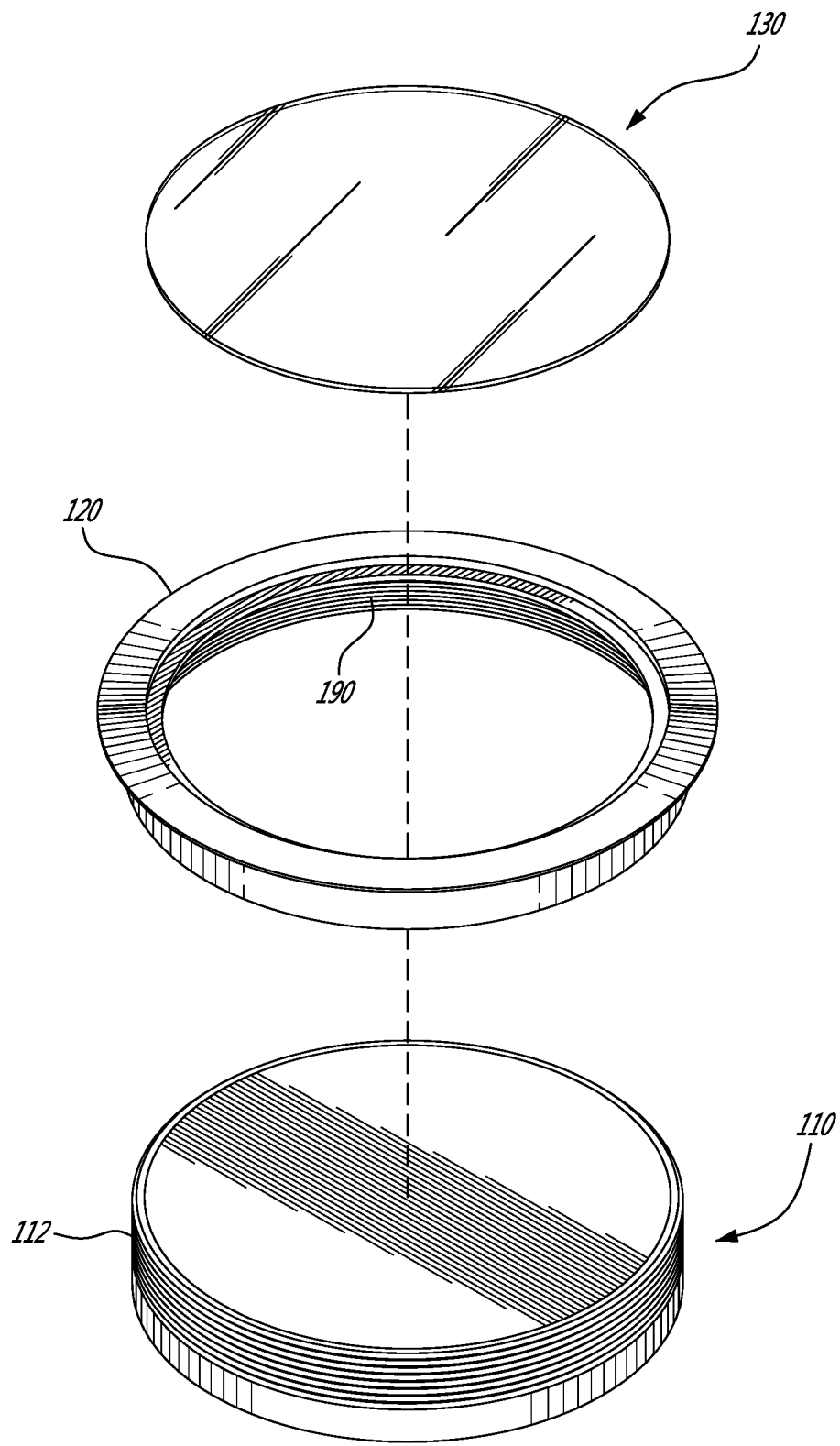

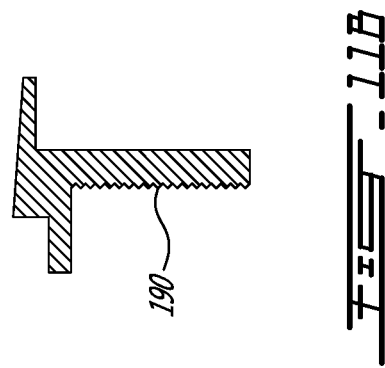
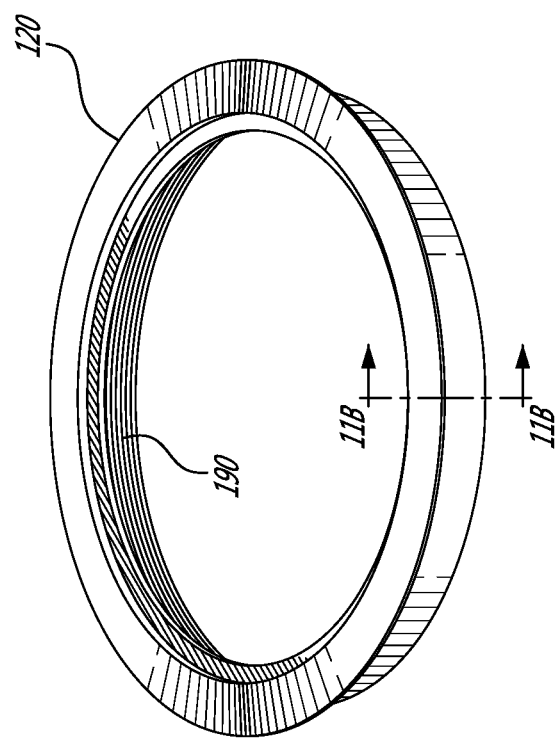

WIRELESS CHARGING SYSTEM FOR SMARTDEVICES, KIT AND METHOD FOR USING THE SAME

CROSS REFERENCE TO RELATED APPLICATIONS

The present non-provisional patent application is a U.S. National Phase of International Patent Application PCT/CA2019/050830, filed Jun. 12, 2019, which is hereby incorporated by reference in its entirety and which claims priority based upon the prior Canadian patent application, entitled "Wireless Charging System For Smartdevices, Kit And Method For Using The Same", application number 3,008, 263, filed Jun. 13, 2018, in the name of MOBLEK INC., which is incorporated herein by reference in its entirety.

FIELD OF THE INVENTION

The present invention generally relates to an assembly for wirelessly charging a smartdevice, such as a cell phone, having incorporated easily replaceable advertising messages.

BACKGROUND OF THE INVENTION

Wireless charging systems having a primary coil for charging electronic devices having a secondary coil by electric induction are known in the art. However, assemblies for such charging systems are mostly static.

SUMMARY OF THE INVENTION

The shortcomings of the prior art are generally mitigated by a charging system for wirelessly charging a smartdevice when the smartdevice is positioned over the charging system. The charging system comprises:
  a charger connectable to an electrical power source for charging the smartdevice, the charger being configured in size to be inserted inside a furniture through an opening located at a top surface of the furniture;
  a fixing element configured for fitting with the opening, the fixing element being affixed to the charger when located inside the opening below the top surface; and
  a removable cap having a top and a bottom surface and configured for capping the fixing element;
    wherein when the removable cap is made of a transparent material, the charging system is then configured to present an advertising message presented on a support affixable to the bottom surface of the transparent cap, the advertising message being then visible through the transparent cap; or
    wherein the top surface of the removable cap comprises the advertising message.

According to a preferred embodiment, the fixing element defines a top recess configured for receiving the removable cap and an external lip configured for abutting an edge of the opening when the fixing element is inserted into the opening.

According to a preferred embodiment, the removable cap has a truncated shape fitting with the truncated cross section of the top recess.

According to a preferred embodiment, the top recess comprises an adhesive material for removably affixing the removable cap to the fixing element.

According to a preferred embodiment, the external lip of the fixing element is affixed to the furniture using an adhesive element.

According to a preferred embodiment, the fixing element is affixed to the furniture by clipping or screwing the fixing element to the opening of the furniture.

According to a preferred embodiment, the charging system further comprise a waterproof seal located between the external lip of the fixing element and the top surface of the furniture adjacent to the opening.

According to a preferred embodiment, the fixing element defines a top squared edge, a triangular edge or a round edge providing a smooth transition from the top surface of the fixing element to the top surface of the furniture.

According to a preferred embodiment, the fixing element is a ring, the removable cap is a disc adapted to insert into a top recess of the ring. Preferably, the ring is made of stainless steel.

According to a preferred embodiment, the smartdevice is a cell phone, a smartwatch, a tablet, a phablet, a laptop computer, a power tool or other handheld devices that have wireless charging capabilities.

According to another aspect, the invention is directed to a method for installing a charging system of a smartdevice when the smartdevice is positioned over the charging system. The method comprises:
  providing a fixing element configured for fitting with an opening located at a top surface of a furniture;
  affixing the fixing element to a charger connectable to an electrical power source for charging the smartdevice;
  inserting the charger inside the furniture through the opening until the fixing element fits with the opening, the charger being then maintained inside the furniture below the top surface;
  providing a removable cap having a top and a bottom surface and configured for capping the fixing element; and
  when the removable cap is made of a transparent material, the method further comprises affixing an advertising message presented on a support to the bottom surface of the transparent cap, the message being then visible through the transparent cap; or
  when the top surface of the removable cap comprises the advertising message, the method further comprises capping the fixing element with the removable cap, the message being then visible on the top surface of the removable cap.

According to a preferred embodiment, the fixing element is affixed to the charger using an adhesive material.

According to a preferred embodiment, the fixing element further comprises a threaded internal potion compatible with an external threaded portion of the charger, the step of affixing the fixing element to the charger comprising screwing the fixing element to the charger.

According to a preferred embodiment, the fixing element is affixed to an edge of the opening by using an adhesive material or by clipping the fixing element to the edge of the opening.

According to yet another aspect, the invention is directed to a method for changing an advertising message of the wireless charging system as defined herein or installed according to the method as defined herein. The method comprising
  a) removing the removable cap and the associated advertising message from the fixing element; and
  b) repositioning onto the fixing element a subsequent removable cap comprising a subsequent associated advertising message.

According to a preferred embodiment, the method further comprising before step b), removing an adhesive material that was used for affixing the removable cap to the fixing element, and repositioning a new adhesive material before repositioning the subsequent removable cap.

According to a preferred embodiment, in step a), the removable cap is removed using a removing tool. Preferably, the removing tool is configured for affixing the cap by suction.

According to yet another aspect, the invention is directed to kit for installing a plurality of wireless charging systems, each system presenting an advertising message. The kit comprises:
- at least one charger unit, each charger unit being connectable to an electrical power source for charging a smartdevice, each charger unit being configured in size to be inserted inside a furniture through an opening located at a top surface of the furniture;
- at least one fixing element unit, each fixing element unit being configured for fitting with the opening, the fixing element being affixed to the charger when the charger is inside the opening below the top surface;
- at least one removable cap unit having a top and a bottom surface, each removable cap unit being configured for capping the respective fixing element;
    - wherein when the at least one removable cap is made of a transparent material, the kit further comprises at least one advertising message presented on a support affixed to the bottom surface of the respective transparent cap, the message being then visible through the transparent cap; or
    - wherein the top surface of the removable cap comprises the advertising message; and
- a removing tool configured to remove the cap from the fixing element to change the advertising message by another advertising message.

Advantageously, the invention allows to provide an advertising message on the top of the charging system that can be easily changed. This is particularly useful when the systems according to the invention are installed in public spaces like in restaurants, top counter of a bar, pub or tavern, conference rooms, hotel bedrooms, etc. The owner of the pub, restaurant, or hotel therefore provides to their clients the possibility of recharging the battery of their smart devices (such as smartphones) while eating, drinking or sleeping. The same owner can also sell commercial advertising spaces to a third party and easily modify the message, e.g., when a related advertisement contract with the third party is updated or cancelled. The kit disclosed herein allows to install several wireless charging system in public spaces and easily and quickly change the advertising messages.

Other and further aspects and advantages of the present invention will be better understood upon the reading of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 3A illustrates the wireless charging system according to another preferred embodiment of the invention;

FIG. 3B is a top view of the fixing element according to a preferred embodiment;

FIG. 9 is an exploded view of the wireless charging system having threaded connection according to a preferred embodiment of the invention;

FIG. 11A is a top isomeric view of the fixing element as a ring having threaded connection according to a preferred embodiment;

FIG. 11B is a cross section view of the fixing ring illustrated on FIG. 11A.

DETAILED DESCRIPTION OF THE PREFERRED EMBODIMENT

A novel wireless charging system will be described hereinafter. Although the invention is described in terms of specific illustrative embodiments, it is to be understood that the embodiments described herein are by way of example only and that the scope of the invention is not intended to be limited thereby.

Figure 1:
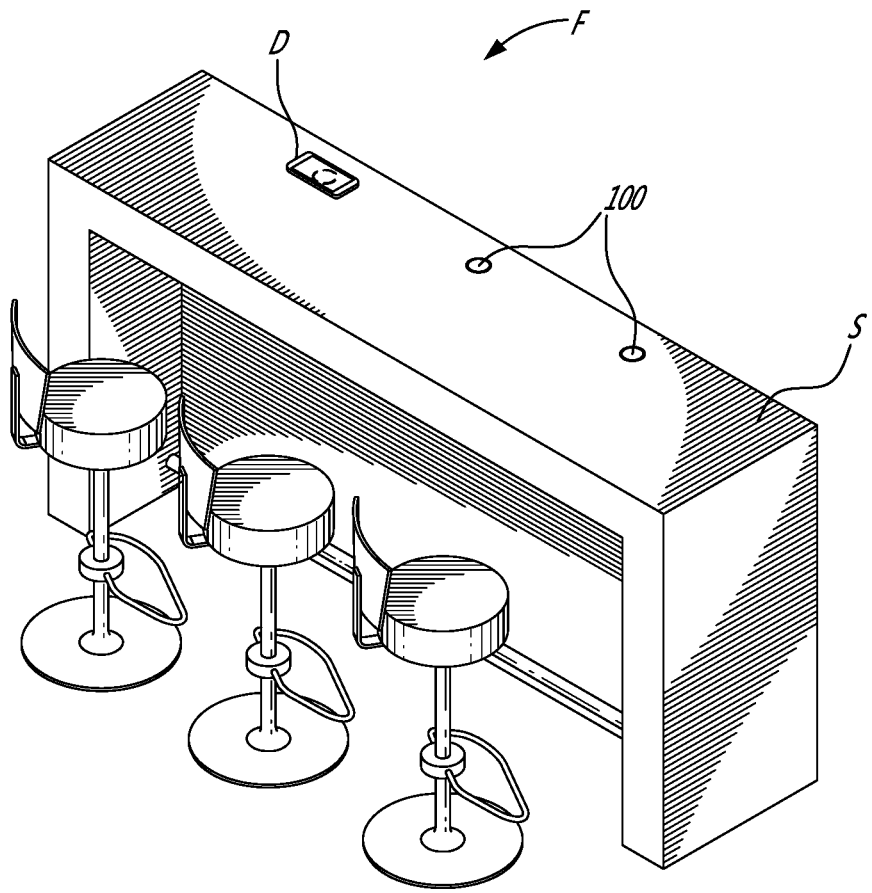
FIG. 1 illustrates the environment of the invention according to a preferred embodiment.
Figure 8A:
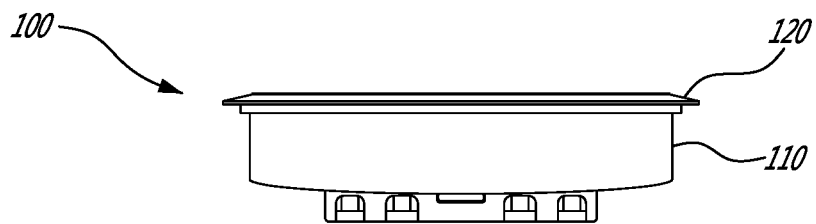
FIG. 8A is a lateral view of the wireless charging system according to a preferred embodiment.
Figure 8B:
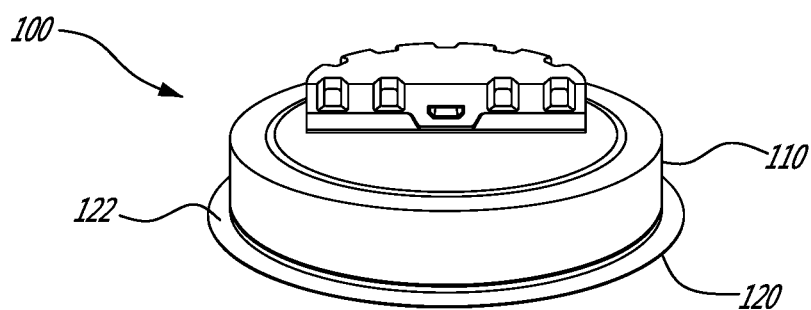
FIG. 8B is a bottom isomeric view of the wireless charging system according to a preferred embodiment.
Figure 8C:
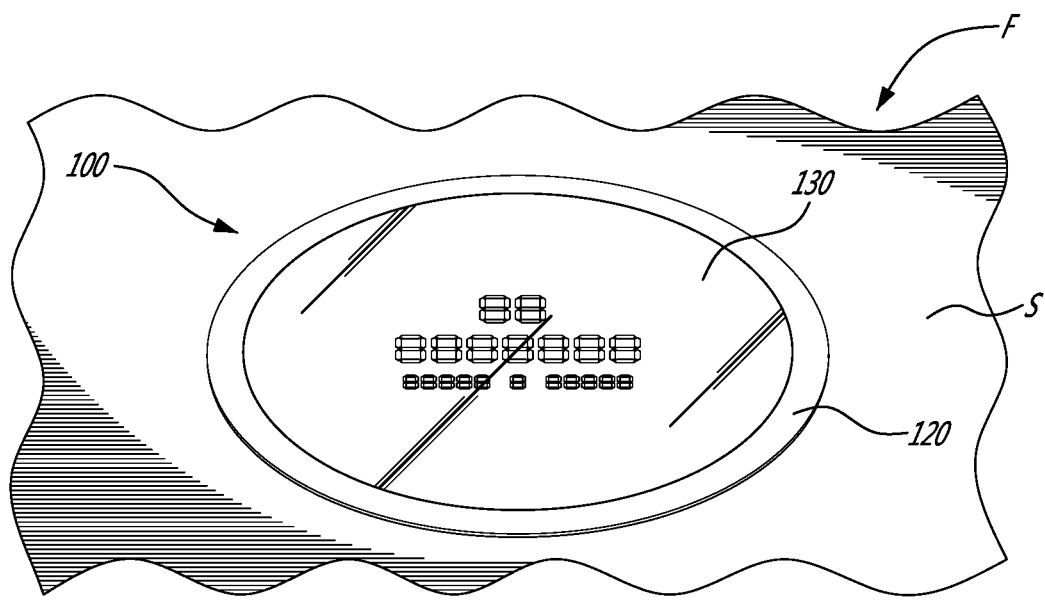
FIG. 8C illustrates the wireless charging system embedded into a top surface of a furniture according to a preferred embodiment.
Figure 10B:
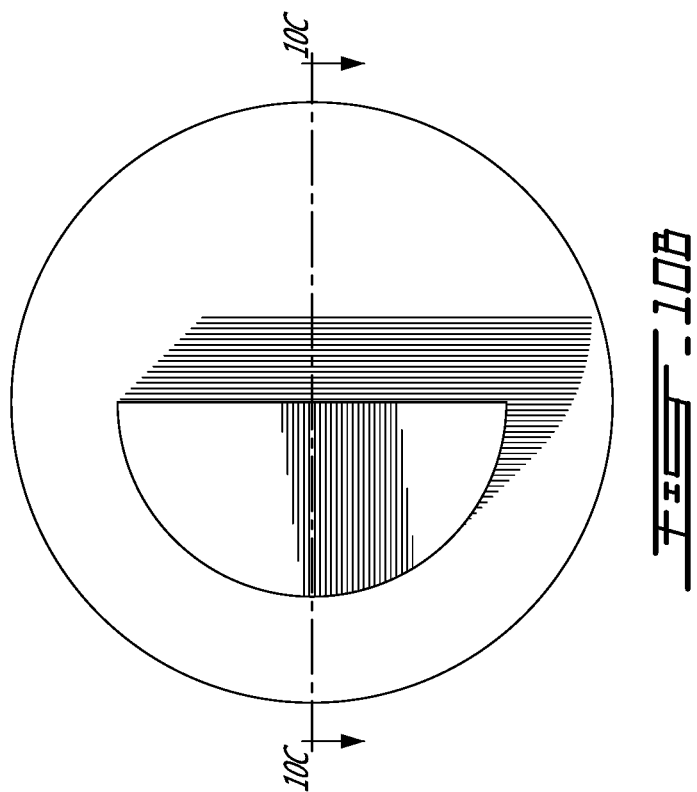
FIG. 10B is a bottom view of the wireless charging system having threaded connection according to a preferred embodiment.
Figure 10C:
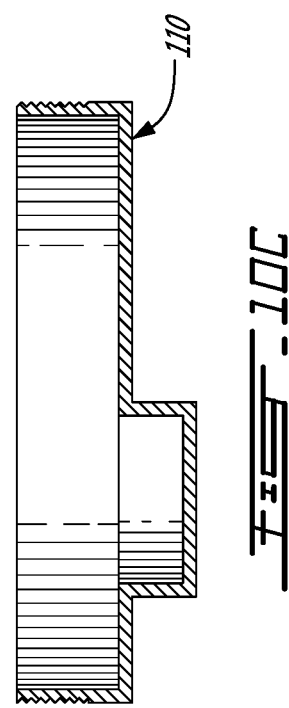
FIG. 10C is a cross section view of the wireless charging system illustrated on FIG. 10B.
Figure 10A:
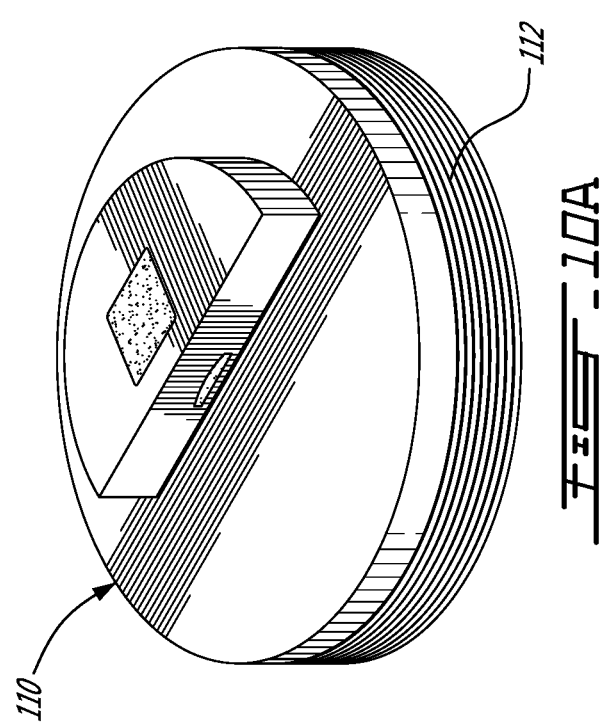
FIG. 10A is a bottom isomeric view of the wireless charging system having threaded connection according to a preferred embodiment.

Illustrated on FIGS. 1 and 8C is an inductively coupled charging system 100 with integrated primary coils embedded on the top surface S of a furniture F, such as the top surface of a counter of a bar as illustrated. Power is inductively coupled from the top surface S with the integrated primary coil to an electronic smartdevice D, such as a smartphone, a cell phone, a smartwatch, a tablet, a phablet, a laptop computer, a power tool or other handheld devices that have wireless charging capabilities typically embodied as a secondary coil. The inductively coupled work surface may alternatively be installed at the top surface of other furniture such as tables, counters in restaurants or home kitchen, furniture in hotel bed rooms, etc. Primary coils integrated into a work surface may provide varying amounts of power. Smartdevices D containing secondary coils, such as laptop computers, PDAs, cell phones, and power tools, are charged when placed on the top surface S where primary coils are integrated.

As illustrated on FIGS. 2, 3A, 8A and 8B, the charging system 100 for wirelessly charging a smartdevice D when the smartdevice is positioned over the charging system comprises a charger 110 connectable to an electrical power source (not illustrated) for charging the smartdevice. The charger 110 is configured in size to be inserted inside the furniture F through an opening 200 located at the top surface S of the furniture F. Any sort of primary coil charger known in the art can be used within the scope of the present invention.

The system 100 further comprises a fixing element 120 configured for fitting with the opening 200. Although the invention described herein shows a circular opening and a fixing element 120 being a ring fitting with the circular opening, different geometries of the opening can be considered within the scope of the invention, inasmuch as the charger can be affixed to the fixing element and can be inserted through the opening. As illustrated in the figures, the fixing element is preferably a ring and the removable cap is preferably a disc adapted to be inserted into the top recess of the ring. The ring is more preferably made of stainless steel but other material may be used within the scope if the invention, such as plastic, wood, etc.

As illustrated on FIGS. 8A and 8B, the fixing element 120 is affixed to the charger. The charger can be suspended inside the opening and retained by the fixing element. Alternatively, the charger can be affixed inside the opening ring other internal fixing elements (not illustrated).

Figure 2:
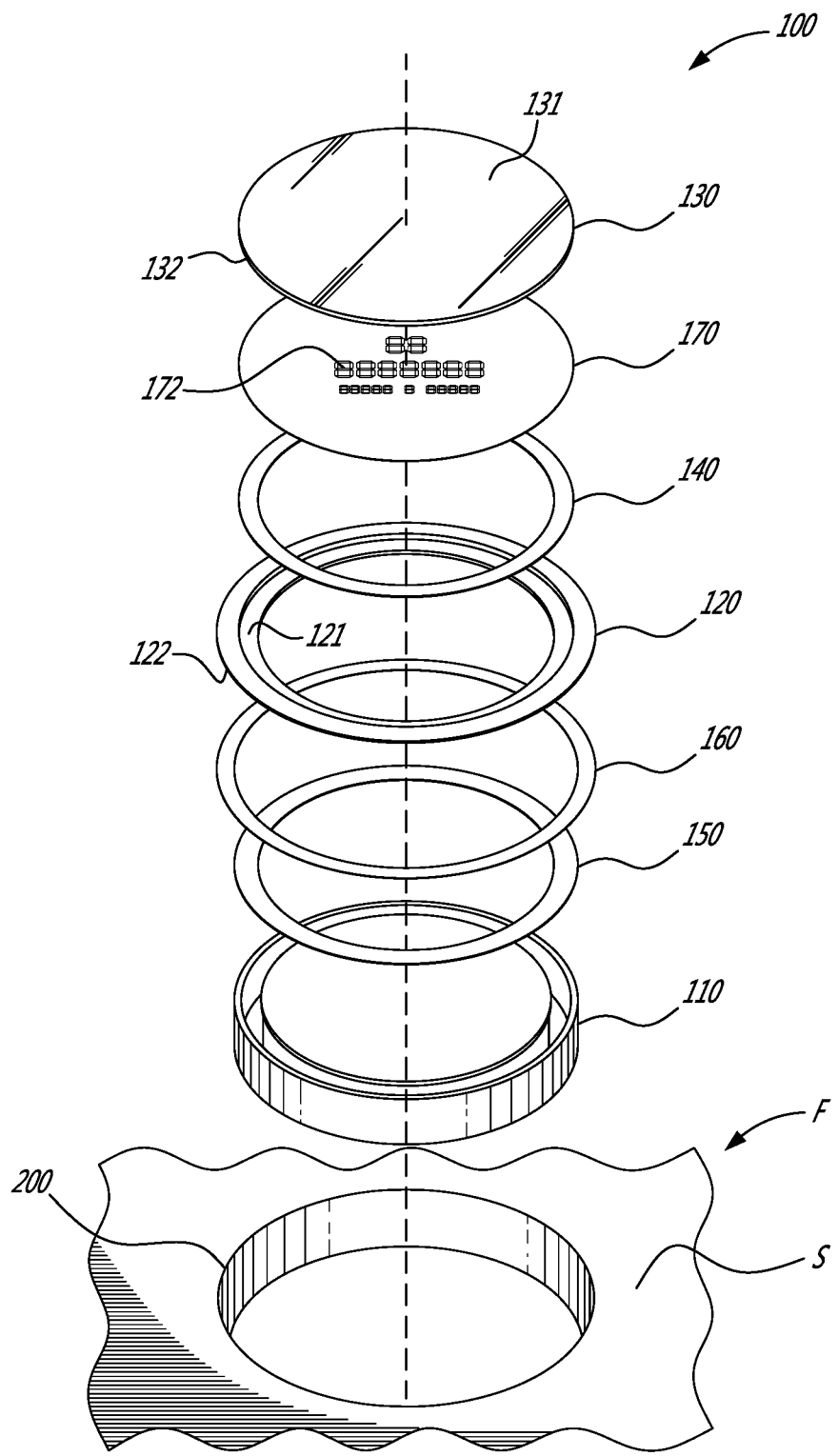
FIG. 2 illustrates a wireless charging system according to a preferred embodiment of the invention.
Figure 4A:
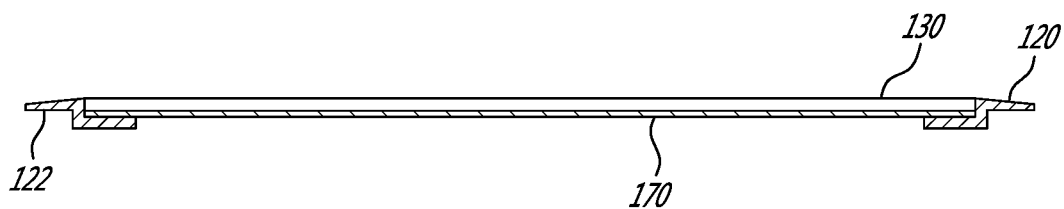
FIG. 4A is a cross section view of the fixing element and cap according to a preferred embodiment.
Figure 4B:
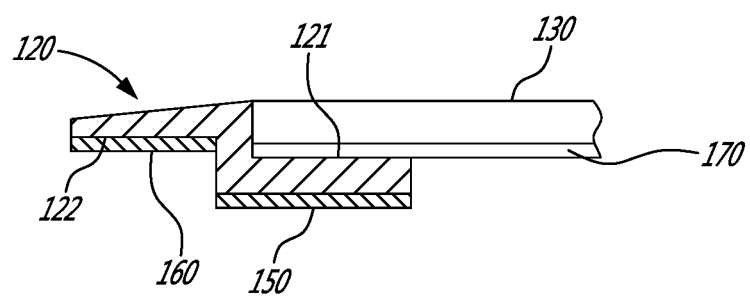
FIG. 4B is a partial cross section view of the fixing element and cap according to a preferred embodiment.

As illustrated on FIGS. 2, 3A and 4B, the fixing element may be affixed to the charger 110 using another adhesive element 150.

Alternatively, the fixing element can be affixed to the charger 110 by screwing the fixing ring 120 to the charger 110 as illustrated on FIGS. 9, 10A, 10B, 10C, 11A and 11B. The fixing element 120 then further comprises a threaded internal potion 190 and the charger comprises an external threaded portion 112. The fixing element 120 can be then screwed to the charger 110 before being inserted into the opening of the furniture.

The system 100 further comprises a removable cap 130 having a top 131 and a bottom 132 surface, the cap 130 being configured for capping the fixing element and covering the charger 110 located inside the furniture F. As illustrated on FIGS. 2, 3A, 3B, 4A and 4B, the fixing element 120 defines atop recess 121 configured for receiving the removable cap 130. The top recess 121 may comprise an adhesive material 140 (FIG. 2 or 3A), such as a double face tape, for affixing the removable cap to the fixing element. The adhesive property of the adhesive material also allows the cap 130 to be removed from the fixing element when need be.

Figure 5A:
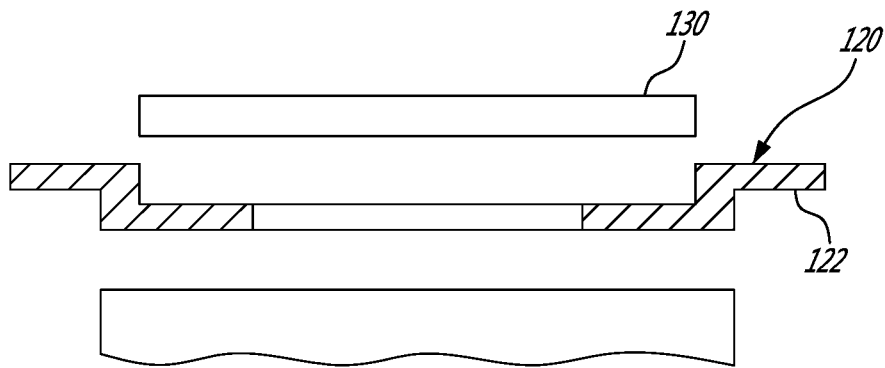
FIG. 5A is an exploded schematic cross section view of the fixing element and the cap according to a preferred embodiment.
Figure 5B:
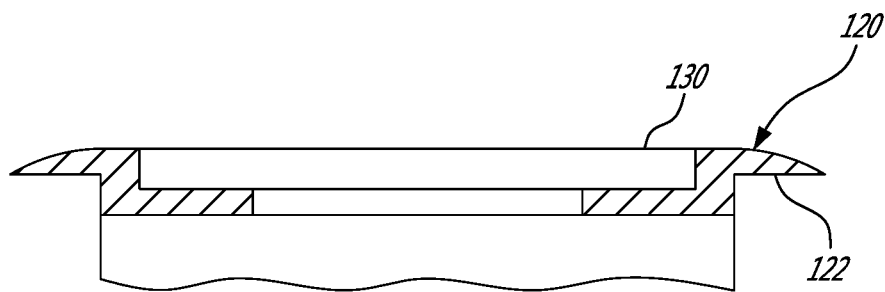
FIG. 5B is a schematic cross section view of the fixing element and cap according to another preferred embodiment.
Figure 6A:
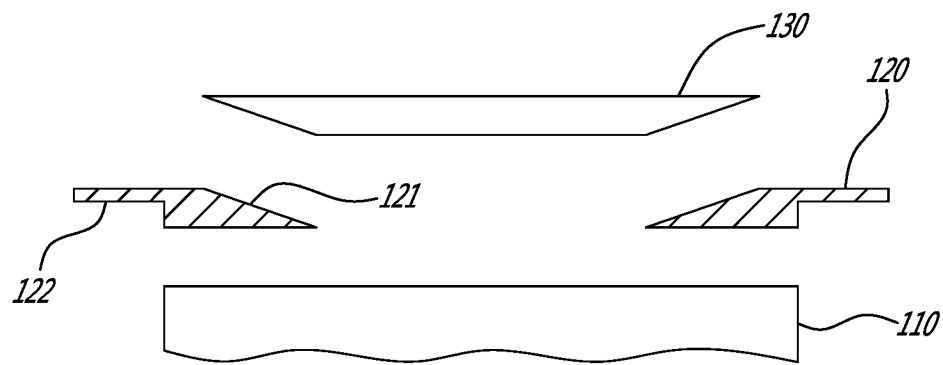
FIG. 6A is an exploded schematic cross section view of the fixing element and cap according to another preferred embodiment.
Figure 6B:
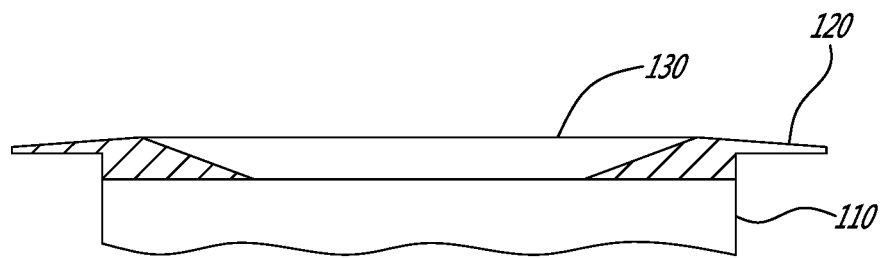
FIG. 6B is a schematic cross section view of the fixing element and cap according to another preferred embodiment.
Figure 6C:
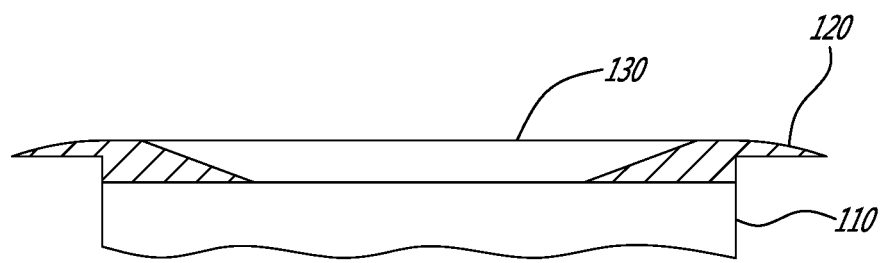
FIG. 6C is a schematic cross section view of the fixing element and cap according to another preferred embodiment.

As illustrated on FIG. 5A or 5B, the removable cap 130 may be a disc with a squared edge fitting with a squared cross section of the top recess 121 of the fixing element 120. According to another embodiment illustrated on FIG. 6A, 6B or 6C, the cap 130 may have a truncated edge fitting with a truncated cross section of the top recess 121. Compared to the squared shape of FIG. 5A or 5B, the truncated shape of FIGS. 6A-6C provides a greater contacting surface between the cap and the recess 121 of the fixing element 120, and also ease the insertion of the cap into the top recess of the fixing element.

The adhesive element 160 may also plays the role of a waterproof seal 160 located between the bottom surface 122 of the lip 120 of the fixing element and the top surface S of the furniture F adjacent to the opening 200 (FIG. 4B). The seal protects the electronic charger 110 embedded into the furniture F from water or other liquid that can be spread by accident on the top surface S.

As illustrated on FIGS. 2, 3A, 4A to 6C, the fixing element comprises an external lip 122 for abutting the edge of the opening 200 when the fixing element 120 is inserted into the opening 200. The external lip may define different geometries, such as a squared lip (FIG. 5A or 6A), a triangular or truncated lip (FIG. 4A, 4B or 6B) or a round lip (FIG. 5B or 6C) for providing a smooth transition from the top surface of the fixing element to the top surface of the furniture as illustrated on FIG. 8C. Other non-illustrated forms for the lips can be considered within the scope of the present invention.

The charging smartdevice may be a cell phone, such as a smartphone. Other electronic devices, such as a laptop computer or a power tool including a secondary inductive coil may be charged using the present system. The smartdevice may also be a tablet, a phablet or other handheld devices that have wireless charging capabilities compatible with the charging system.

As illustrated on FIG. 2, the removable cap 130 may be made of a transparent material, such as plastic or glass, more preferably plastic. An advertising message 172 may be printed on a support 170 such as a disc of paper or plastic, affixed or not to the bottom surface 132 of the transparent cap 130, the message being then visible through the transparent cap.

Alternatively, and as illustrated on FIG. 3A, the advertising message 172 can be printed directly on the bottom surface 132 of the cap 130. Another option would be to have the advertising message 172 printed or embossed on the top surface 131 of the removable cap. The cap does not have to be transparent in that case.

The invention also concerns a method for installing a charging system of a smartdevice when the smartdevice is positioned over the charging system. The method comprises:
  providing a fixing element configured for fitting with an opening located at a top surface of a furniture;
  affixing the fixing element to a charger connectable to an electrical power source for charging the smartdevice;
  inserting the charger inside the furniture through the opening until the fixing element fits with the opening, the charger being maintained inside the furniture below the top surface;
  providing a removable cap having a top and a bottom surface and configured for capping the fixing element; and
  when the removable cap is made of a transparent material, the method further comprises affixing an advertising message presented on a support to the bottom surface of the transparent cap, the message being then visible through the transparent cap; or
  when the top surface of the removable cap comprises the advertising message, the method further comprises capping the fixing element with the removable cap, the message being then visible on the top surface of the transparent cap.

Preferably, the fixing element is affixed to the charger using an adhesive material or by screwing as detailed above.

Preferably, the fixing element is affixed to the edge of the opening by using an adhesive material or by clipping the fixing element to the edge of the opening.

According to another aspect, the invention concerns a method for changing an advertising message of the wireless charging system as defined here or installed according to the method disclosed above. The method comprises:
   a) removing the removable cap 130 and the associated advertising message 170-172 from the fixing element 120; and
   b) repositioning onto the fixing element a subsequent removable cap comprising a subsequent associated advertising message.

Preferably, the method further comprises before step b), the step of removing an adhesive material 140 that was used for affixing the removable cap to the fixing element, and repositioning a new adhesive material before repositioning the subsequent removable cap.

Figure 7:
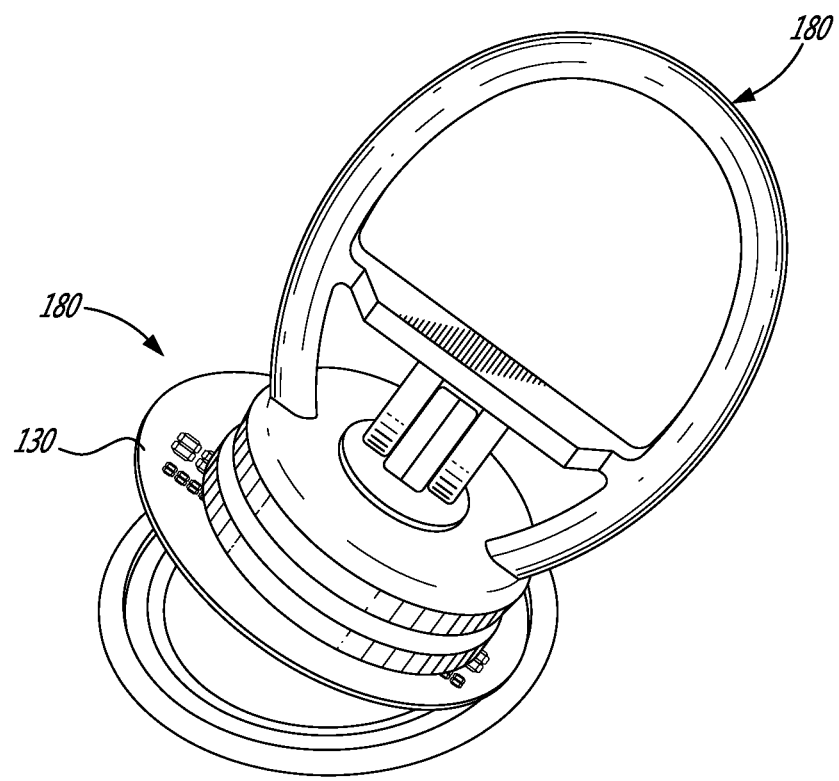
FIG. 7 illustrates the removal of the cap from the fixing element using a specific tool according to another preferred embodiment.

As illustrated on FIG. 7, in step a), the removable cap is removed using a removing tool 180. Preferably, the removing tool is configured for affixing the cap by suction.

According to another aspect, the invention also concerns a kit for installing a plurality of wireless charging systems, each system presenting an advertising message, the kit comprising:
   at least one charger unit 110, each charger unit being connectable to an electrical power source for charging a smartdevice, each charger unit being configured in size to be inserted inside a furniture through an opening located at a top surface of the furniture;
   at least one fixing element unit 120, each fixing element unit being configured for fitting with the opening, the fixing element being affixed to the charger located inside the opening below the top surface;
   at least one removable cap 130 unit having a top and a bottom surface, each removable cap unit being configured for capping the fixing element 120;
      wherein when the at least one removable cap is made of a transparent material, the kit further comprises at least one advertising message 172 presented on a support 170 affixed to the bottom surface of the respective transparent cap, the message being then visible through the transparent cap; or
      wherein the top surface of the removable cap comprises the advertising message; and
      a removing tool 180 configured to remove each cap from its respective fixing element to change the advertising message by another advertising message.

The invention allows to present an advertising message on the top of the charging system. This is particularly useful when the systems according to the invention are installed in public areas like on tables of a restaurant, on a counter of a bar or pub, on a table in a conference room, on furniture of hotel bedrooms, etc. The owner of the public area therefore provides to their clients the possibility of recharging the battery of the smartdevice (smartphone) while being present in the public area without the use of an electric wire. The same owner can also sell commercial advertising spaces to a third party and easily modify the advertising message when the contract with the third party is changed or cancelled. The kit disclosed herein allows to install several wireless charging system in public spaces and easily and quickly change the advertising messages While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art. Skilled persons will readily understand that the drawings are not necessarily drawn to scale.

The invention claimed is:

1. A charging system for wirelessly charging a smart device, when the smart device is positioned over the charging system, the charging system comprising:
   a charger connectable to an electrical power source for charging the smart device, the charger being configured in size to be inserted inside a furniture through an opening located at an upper surface of the furniture;
   a fixing element configured for fitting with the opening, the fixing element being affixed to the charger; and
   a removable cap having a top and a bottom surface and configured for capping the fixing element and being non-permanently retained by the fixing element;
   wherein:
      the removable cap is made of a transparent material, the charging system then further comprises an advertising message presented on a support affixable to the bottom surface of the transparent cap, the advertising message being then visible through the transparent removable cap; or
      the charging system comprises the advertising message printed or embossed on the top surface of the removable cap.

2. The charging system of claim 1, wherein the fixing element defines a top recess configured for receiving the removable cap and an external lip configured for abutting an edge of the opening when the fixing element is inserted into the opening.

3. The charging system of claim 2, wherein the removable cap has a truncated shape fitting with the truncated cross section of the top recess.

4. The charging system of claim 2, wherein the top recess comprises an adhesive material for removably affixing the removable cap to the fixing element.

5. The charging system of claim 2, wherein the external lip of the fixing element is affixed to the furniture using an adhesive element or by clipping the external lip to the opening.

6. The charging system of claim 2, wherein the fixing element is affixed to the charger by screwing the fixing element to the opening of the furniture.

7. The charging system of claim 6, wherein the fixing element further comprises a threaded internal portion compatible with an external threaded portion of the charger for screwing the fixing element to the charger.

8. The charging system of claim 2, further comprising a waterproof seal located between the external lip of the fixing element and the upper surface of the furniture adjacent to the opening.

9. The charging system of claim 1, wherein the fixing element defines a top squared edge, a triangular edge or a round edge providing a transition from the top surface of the fixing element to the upper surface of the furniture.

10. The charging system of claim 1, wherein the fixing element is a ring, the removable cap is a disc adapted to be inserted into a top recess of the ring.

11. The charging system of claim 10, wherein the ring is made of stainless steel, composite or plastic material.

12. The charging system of claim 1, wherein the smart device is a cell phone, a laptop computer or a power tool.

13. A method for changing an advertising message of the wireless charging system as defined in claim 1, the method comprising:
   a) removing the removable cap and the associated advertising message from the fixing element; and
   b) repositioning onto the fixing element a subsequent removable cap comprising a subsequent associated advertising message.

14. The method of claim 13, further comprising before step b), removing an adhesive material that was used for affixing the removable cap to the fixing element, and repositioning a new adhesive material before repositioning the subsequent removable cap.

15. The method of claim 13, wherein in step a), the removable cap is removed using a removing tool.

16. The method of claim 15, wherein the removing tool is configured for connecting the cap by suction.

17. The charging system of claim 1, wherein the charger for charging the smart device comprises an integrated primary coil for charging by induction the smart device when positioned over the charging system, the smart device comprising a secondary coil compatible with the integrated primary coil of the charger.

18. A method for installing a wireless charging system of a smart device when the smart device is positioned over the charging system, the method comprising:
   providing a fixing element configured for fitting with an opening located at a top an upper surface of a furniture;
   affixing the fixing element to a charger connectable to an electrical power source for charging the smart device;
   inserting the charger inside the furniture through the opening until the fixing element fits with the opening, the charger being then located inside the furniture below the top surface;
   providing a removable cap having a top and a bottom surface and configured for capping the fixing element and being non-permanently retained by the fixing element; and
   wherein the removable cap is made of a transparent material, the method further comprises affixing an advertising message presented on a support to the bottom surface of the transparent removable cap, the message being then visible through the transparent removable cap; or
   wherein the removable cap comprises the advertising message printed or embossed on the top surface, the method further comprises capping the fixing element with the removable cap, the message being then visible on the top surface of the removable cap.

19. The method of claim 18, wherein the fixing element is affixed to the charger using an adhesive material.

20. The method of claim 18, wherein the fixing element further comprises a threaded internal potion compatible with an external threaded portion of the charger, the step of affixing the fixing element to the charger comprising screwing the fixing element to the charger.

21. The method of claim 18, wherein the fixing element is affixed to an edge of the opening by using an adhesive material or by clipping the fixing element to the edge of the opening.

22. A kit for installing a plurality of wireless charging systems, each system presenting an advertising message, the kit comprising:
   at least one charger unit, each charger unit being connectable to an electrical power source for charging a smart device, each charger unit being configured in size to be inserted inside a furniture through an opening located at an upper surface of the furniture;
   at least one fixing element unit, each fixing element unit being configured for fitting with the opening, the fixing element being affixed to the charger;
   at least one removable cap unit having a top and a bottom surface, each removable cap unit being configured for capping the respective fixing element and being non-permanently retained by the respective fixing element;
   wherein:
      the at least one removable cap is made of a transparent material for presenting at least one advertising message on a support configured for being affixed to the bottom surface of the respective transparent removable cap, the message is then visible through the transparent removable cap; or
      the at least one removable cap comprises the advertising message printed or embossed on the top surface; and
      optionally, a tool configured to remove the removable cap from the fixing element to change the advertising message by another advertising message.

* * * * *